United States Patent [19]

De Pommery et al.

[11] 4,443,049

[45] Apr. 17, 1984

[54] CONNECTOR FOR PORTABLE OBJECTS SUCH AS CREDIT CARDS

[75] Inventors: Bertrand J. C. H. De Pommery, St-Nom-La-Breteche; Jean-Paul C. Goupil, Sevres, both of France

[73] Assignee: Compagnie Internationale pour l'Informatique Cii/Honeywell Bull (Societe Anonyme), Paris, France

[21] Appl. No.: 105,654

[22] Filed: Dec. 20, 1979

[30] Foreign Application Priority Data

Dec. 27, 1978 [FR] France .................................. 78 36544
Mar. 6, 1979 [FR] France .................................. 79 05761
Aug. 14, 1979 [FR] France .................................. 79 20644

[51] Int. Cl.³ ........................................... H01R 13/635
[52] U.S. Cl. .............................. 339/75 MP; 339/12 R
[58] Field of Search ................ 339/17 E, 12 R, 79, 339/75 MP, 176 MP

[56] References Cited

U.S. PATENT DOCUMENTS

| | | | |
|---|---|---|---|
| 2,936,439 | 5/1960 | Murphy | 339/176 MP |
| 3,864,012 | 2/1975 | Cutchaw | 339/75 MP X |
| 4,118,094 | 10/1978 | Key | 339/75 MP |
| 4,221,448 | 9/1980 | Logerot et al. | 339/75 MP |

*Primary Examiner*—Eugene F. Desmond
*Attorney, Agent, or Firm*—Kerkam, Stowell, Kondracki & Clarke

[57] ABSTRACT

A connector for a portable object particularly adapted for credit cards having an IC chip thereon comprises an element incorporating a chamber having an opening adapted to receive the portable object along a predetermined direction. Means for grasping the portable object are contained in the chamber and actuable by the displacement of the portable object. The means for grasping the portable object comprises a first jaw and a second jaw formed by a member which is not integral with the element and cooperating with a guiding device such that it is displaced in the chamber along the predetermined direction between a stable idle position close to the opening and an operating position away from the opening. The member is tipped with respect to the portable object between the idle and operating positions. The member comprises an entrainment device disposed to receive an extreme portion of the portable object and for entrainment of the member between idle and operating positions by the sole displacement imparted to the portable object along the predetermined direction. Magnetization means may be included for retaining the jaws in the operating position. At least one of the jaws may include electrical contact elements arranged to make contact with corresponding output terminals on the chip. The electrical contact elements are flexible having one end fixed to the second jaw and its other end free.

20 Claims, 14 Drawing Figures

CONNECTOR FOR PORTABLE OBJECTS SUCH AS CREDIT CARDS

CROSS REFERENCE TO RELATED APPLICATIONS

Various aspects of credit or printed circuit cards to which the present invention has application are disclosed in commonly-assigned applications Ser. No. 4,588, now U.S. Pat. No. 4,222,516 of Badet et al, filed Jan. 18, 1979 and entitled "A Portable Standardized Card Adapted To Provide Access To A System For Processing Electrical Signals And A Method Of Manufacuring Such a Card", which is a continuation of application Ser. No. 751,954, filed Dec. 17, 1976 and now abandoned; Ser. No. 931,686 now U.S. Pat. No. 4,216,577 of Badet et al, filed Aug. 7, 1978 as a division of the aforesaid application Ser. No. 751,954; Ser. No. 69,252 of Courant et al, filed Aug. 24, 1979, now abandoned in favor of divisional application Ser. No. 190,808, filed Sept. 25, 1980 and entitled "Integrated Circuit Wafers And Method Of Producing Said Wafers On A Continuous Carrier Strip"; and Ser. No. 69,253 now U.S. Pat. No. 4,264,917 of Michel Ugon, filed Aug. 24, 1979, and entitled "Flat Package For Integrated Circuit Devices". The subject matter of said applications resulting patents is hereby incorporated by reference.

BACKGROUND OF THE INVENTION

1. Field of the Invention

The invention relates to connectors for portable objects such as credit cards or printed circuit cards.

2. Description of the Prior Art

A great variety of connectors are available for portable objects such as credit cards and printed circuit cards forming substrata for interconnection of electronic devices. As a rule, all these connectors essentially comprise elements incorporating a chamber which has an opening appropriate to receive a card along a predetermined direction and which contains a twin-jaw device for grasping the card by an "operating" edge, upon insertion of the card into the chamber.

The greater proportion of these connectors appertain to the group known as "sliding contact connectors", so called because their jaws are formed by flexible conductive contact blades in mutual confrontation which are spread apart from each other when the card is inserted. The jaws enclamp the operating edge of the card at the level of its output terminals. In this condition, the jaws are considered to be in their "operating position". An "idle position" is established when the card is absent or withdrawn.

It will be appreciated that such connectors are satisfactory for cards or substrata where the output terminals are contacts which are all distributed adjacent to and along the operating edge of the card and which have comparatively long conductors in the direction of manipulation of the card such that the connectors slide along the terminal conductors and immobilize the card they enclamp more satisfactorily, establish satisfactory electrical contacts with the output terminals of the card automatically provide a self-cleaning action on the terminals to the sliding of the contact blades of the jaws over the terminals when the card is received in the chamber, and prevent the contact blades from having to sweep over another surface of the card other than the output terminals so as to minimize the risk of being deleterious to the degree of wear of the blades and to the required quality of the electrical contacts.

The greater the extension of the output terminals of the card in the direction of manipulation of the card and/or the more powerful the gripping action engendered by the contact blades carried by the jaws of the connector, the more satisfactory is the connection. This is why if, as desirable and frequently required, the output terminals of a card cover no more than a small proportion of the surface of the card, the connector will require the application of a prohibitive and often intermittent force by a operator for inserting or withdrawing the card. Further, the number of operations will be restricted so that wear on the output terminals and contact blades caused by each operation is minimized and does not impair the quality of the electrical contacts.

As a palliative against these drawbacks, there has been developed a connector generally referred to as a ZIF (zero insertion force) connector. This connector is analogous to the sliding contact connector, but comprises a mechanism for opening and closing the jaws upon actuation by an operator. The operator secures the printed circuit card by first opening the jaws of the connector, thereafter freely inserting the card between the jaws (without force), and then closing the jaws on the card. To release the card, the jaws are again opened so that the cards may be withdrawn without any friction or sliding contact. Although the attrition and insertion force is eliminated by a ZIF connector, this connector requires the addition of an operating mechanism which renders it costlier and bulkier and, if the connector is placed at the unrestricted disposal of the public for the purpose of numerous operations, such as may be required at a remote banking terminal, there are imposed operating standards, measures for protection of the condition of the apparatus against any foreign substance (a self-cleaning action no longer applies) and measures to prevent mishandling or negligence on the part of the users. Means for verifying and indicating the authenticity of the connection established, i.e. that the jaws are properly closed and the correct circuit condition and connection of the proper electrical contacts established must also be provided.

Apart from these disadvantages which are inherent from the structure and use of such connectors, such connectors are specifically limited to the aforesaid type of printed circuit card and would be particularly inappropriate for printed circuit cards where the output terminals are contacts of small surface area, crowded into a rather small section of the card in the direction of but comparatively distant from the operating edge and, further, aligned in columns in the direction of handling of the card or at right angles thereto. On the one hand, the contact blades would be caused to sweep a surface of greater or lesser length of the card and would age and deteriorate very rapidly, and on the other hand, those blades which the card would encounter initially at the time of insertion would pass consecutively over the output terminals of each column which, from the electrical point of view, would require restrictive safety measures to prevent false readings.

Credit cards are normally fabricated to comply with standard specification ISO/DIS 2,894 promulgated by the International Standards Organization as noted in the aforementioned application of Badet et al, Ser. No. 4,588. These standard specifications require that a card of this kind should be rectangular, measuring 85.59±0.12 mm×53.95±0.06 mm and have a thickness of 0.76±0.08 mm, to which it is permissible to add at most 0.50 mm, for example, for markings or layers which may indicate the name and address of the card holder. Such markings or layers may take the form of attached adhesive labels or they may be made by stamping of the card itself. According to the invention described in the aforesaid application Ser. No. 4,588, within a cavity of the card is housed an IC (integrated circuit) chip comprising a thin substrate equipped at one side with an integrated circuit device incorporating a memory and its controls for storing data showing debits, credits and the confidential code of the card holder and, at the other side, a plurality of contact segments intended to form the electrical output terminals of the card. An IC chip of a kind appropriate for a credit card of this nature is described, for example, in the aforenoted applications Ser. Nos. 69,252 and 69,253.

The advantage of a card of this kind consists in the ease of its manufacture attributable to the fact that the card may be made from a single sheet, that no more than one cavity need be formed in the same, and that the chip need merely be glued or welded after insertion into the cavity. Another advantage derives from the fact that the chip in which all the electrical circuits of the card are concentrated occupies a small surface of the card. Thus, a comparatively flexible card may be utilized, particularly if the chip is situated in a corner of the card.

As compared to the printed circuit card of known type hereinabove noted, the output terminals of a credit card of the kind described in the aforenoted patent applications Ser. Nos. 4,588, 69,252 and 69,253 are not aligned on one of its edges, but rather are concentrated in a section spaced apart form the edges. The output terminals are all situated on one and the same side of the card, they are preferably arranged in columns in the direction of the length or the width of the card on the score of ease of production and of connection to the conductors; and, because of the small permissible thickness of the card, the substratum of the IC chip is thin and comparatively flexible, which prevents any forcible contact between connector blades and output terminals of the card. Moreover, the credit card is an object commonly intended for a huge public and, in these circumstances, should be able to undergo a predetermined number of actions or transactions in the connectors without damage. The connectors, as a corollary, should be instruments which are robust, easy to use and reliable for a very great number of operations. It should be observed moreover, that more and more credit cards with incorporated integrated circuit devices will be employed in the future to allow processing these cards at remotely located terminals or connectors which may be portable themselves, to enable the holder of a card or a merchant to ascertain the balance of the user's account or at least to establish a credit check. Consequently, it is desirable for portable connectors to be robust, easy to use, light, of little bulk, inexpensive and as durable as possible.

Known attempts to produce connectors for credit cards include lever arrangments of the "compositor" type. A lever suspended at a fixed point of the connector element, comprises contact blades at its free extremity. The operator, upon inserting his card beneath the free extremity, pushes on the same to cause it to tip and thus to bring the blades in contact with the output terminals of the card. The lever is also commonly coupled to return means impelling it towards its idle position, as well as to locking means to stablize the same in one of its idle or operating positions. The return force frequently consists of the force of gravity, in which case the lever should be comparatively heavy and bulky and the connector installed at a permanent site. On the other hand, if the return force is provided by an element such as a spring, the addition of this element to the lever increases its bulk and fragility. Furthermore, the means of locking the lever in at least one of its idle and operating positions are added to the already substantial volume occupied by the lever, rendering the connector structure more complex and its application less easy.

The present invention fulfills the aforesaid requirements of fixed or portable connectors or terminals for credit cards and, in more general terms, it retains these same advantages for credit cards which may or may not be intended to be connected electrically, by means of, for example, a chip thereon to an associated electronic device. The portable connector, on the other hand, may simply cooperate with cards, notes or tickets, for the purpose of performing desired functions such as, for example, dating.

SUMMARY OF THE INVENTION

All the advantages of the present invention are obtained by means of a connector for a portable object comprising an element incorporating a chamber having an opening adapted to receive the portable object along a predetermined direction and means for grasping the portable object. The jaws are contained in the chamber and are actuable by the displacement of the portable object. The invention is characterized in that the means for grasping the portable object comprises a first jaw and a second jaw formed by a member which is not integral with the element and cooperating with a guiding device such that it is displaced in the chamber along the predetermiend direction between a stable idle position close to the opening and an operating position and that it is tipped with respect to the portable object between the idle and operating positions. The member comprises an entrainment device disposed to receive an extreme portion of the portable object and for entrainment of the member between idle and operating positions by the sole displacement imparted to the portable object along the predetermined direction.

A particulary uncomplicated embodiment of these connectors arises when one side of the chamber acts as the first jaw and when the member, referred to herein as a "rocker" has as its guiding means the opposed sides of the chamber and as its entrainment device a stop arranged to receive the operating edge of the portable object and an element for adhering to the portable object during a part of the handling operation. Furthermore, in order to provide the member with stable operating and idle positions, permanent magnets are judiciously arranged on two mutually opposed sides of the chamber and of the member.

The foregoing arrangement renders it possible to provide a connector of small bulk, high strength and ease of application and which allows the member to impinge gently on the portable object and grip the later increasingly in step and at the rate of its penetration into the connector without the appearance of any appreciable relative displacement between the member and the portable object. The condition of the portable object remains practically unaffected from the mechanical as well as electrical points of view. In other terms, the very low degree of attrition which may be implicated puts the connector and the portable object in the situation of undergoing numerous handling operations without being damaged. The small relative displacement which may be present, depending on the form of embodiment selected, may be exploited to provide a self-cleaning action on the output terminals by the contact blades. Moreover, another advantage of this structure is that it is possible to handle cards having output terminals on the operating edge or spaced apart from the operating edge.

In the preferred embodiment of the invention, the lower surface of the portable object bears constantly on the floor or base of the chamber while sliding on the same. This face, however, may require special consideration in particular cases. For example, this is the case in which credit cards have output terminals on two opposed surfaces. This may happen to be a credit card analogous to the type described in the aforesaid application Ser. No. 4,588, but incorporating two data processing IC chips or wafers, or a card equipped with a case comprising output terminals distributed over both its opposed surfaces, as described, for example, in the aforenoted patent application Ser. No. 69,253.

With the aforesaid connector, the output terminals of the upper surface of the card would consequently benefit from the advantages of the invention, but the output terminals of the lower surface would be caused to slide over the base of the connector chamber, while the corresponding contact elements in contact with the base would rub against a surface of the card other than the surface of the output terminals. It follows that the card and the contacts of the lever (or rocker) would deteriorate and become unusable after a small number of operations, which is smaller the higher the degree of miniaturization. In particular, this is the case with standardized credit cards, incorporating a device for processing of the data. As a consequence, in accordance with another feature of the invention, the first jaw is also formed by a member analogous to that of the second jaw.

In other words, the resulting connector differs from that previously described by the fact that it comprises two rocker members. The rockers are arranged symmetrically within the chamber with respect to the path of the portable object and both are equipped with analogous devices for simultaneous and analogous action, so that upon gripping the card it is possible to connect output terminals electrically, no matter on which, and where, of the two opposed surfaces of the card the contacts are situated. To this end, the rocker comprises electrical contact elements intended to cooperate with the corresponding output terminals of the card when the rocker is in its operating position.

The following description will demonstrate that the application of flexible contacts having a free extremity which leads to a self-cleaning action on the output terminals of a credit card, thanks to the friction or rubbing action of the free extremities of the contacts over the corresponding terminals of the card upon insertion of the latter into the connector. According to one form of embodiment of the invention, the flexible contacts are linear blades having a stationary extremity integral with the rocker, and a free extremity directed towards the bottom of the chamber housing the rocker and equipped with a rounded-off projecting contact area to provide the electrical connection between the rocker and the card while the latter is situated in its operating position.

With this kind of contact, the stroke of its free extremity over the corresponding output terminal varies in proportion to the cosine of the angle of pivotal displacement of the contact around its fixed extremity.

According to another advantageous feature of the invention, in the case which the rocker is equipped with flexible electrical contact elements having the corresponding free extremities intended to make contact with the corresponding output terminals of the card when the rocker is in its idle position, the free extremity of each of these elements is directed towards the opening.

BRIEF DESCRIPTION OF THE DRAWINGS

The features and advantages of the invention will be more readily apparent from the following description given with reference to the accompanying drawings, wherein.

FIG. 2 comprises two parts, FIG. 2A and FIG. 2B.

FIG. 3 comprises three parts, FIG. 3A, FIG. 3B and FIG. 3C.

FIG. 4 comprises two parts, FIG. 4A and FIG. 4B, FIGS. 4A and 4B are views in median longitudinal cross-section analogous, respectively, to the view of FIGS. 3A and 3C. FIGS. 4A and 4B illustrate an embodiment of a connector in accordance with the invention, wherein the jaws are shown in their idle position in FIG. 4A and in their operating position in FIG. 4B;

FIG. 5 comprises two parts.

FIG. 6 comprises two parts, FIG. 6A and FIG. 6B, FIG. 7 comprises two parts.

DESCRIPTION OF THE PREFERRED EMBODIMENTS

Figure 1:
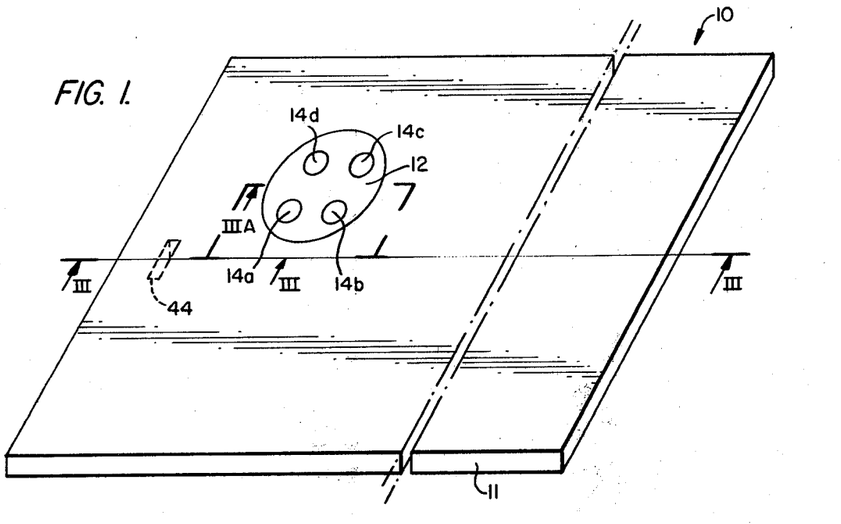
FIG. 1 is a perspective view from above of a credit card of the type specified in the aforesaid application Ser. No. 4,588, this card being taken as a representative example of a portable object applicable to a connector in accordance with the present invention.

FIG. 1 illustrates a credit card 10 comprising a relatively flexible sheet 11, commonly of plastic material, and having a wafer or integrated circuit (IC) chip 12 thereon. It will be assumed that the card 10 complies with the aforenoted ISO/DIS standard, that is to say the sheet 11 is rectangular in shape, having dimensions of approximately 86 mm×54 mm and a thickness of 0.76 mm. IC chip 12 is of the type specified in the aforesaid patent application Ser. No. 69,252 and consequently has the structure illustrated diagrammatically in FIG. 3A in the crosssection taken along the line III-A shown in FIG. 1. It is thus apparent that the wafer 12 is formed by a thin electrically insulating substrate 13. One surface carries a plurality of conductive elements 14, four in the illustrative case shown, 14a–14d. However, more or less conductive elements may be provided and these elements form the electrical output terminals of the card 10. The other face or surface of wafer 12 includes or carries integrated circuit 15 equipped with suitable output conductors 16. Conductors 16 are arranged to contact, respectively, with the elements 14 via holes (not illustrated) made in the substrate 13. The wafer or chip 12 is located in a corresponding cavity 17 formed in the sheet 11 of the card 10. Cavity 17 is adapted for appropriately housing the integrated circuit device 15 which, as a common rule, contains a memory and control circuit for entering confidential code or data of a card holder, as well as future debit and credit data.

Figure 2A:
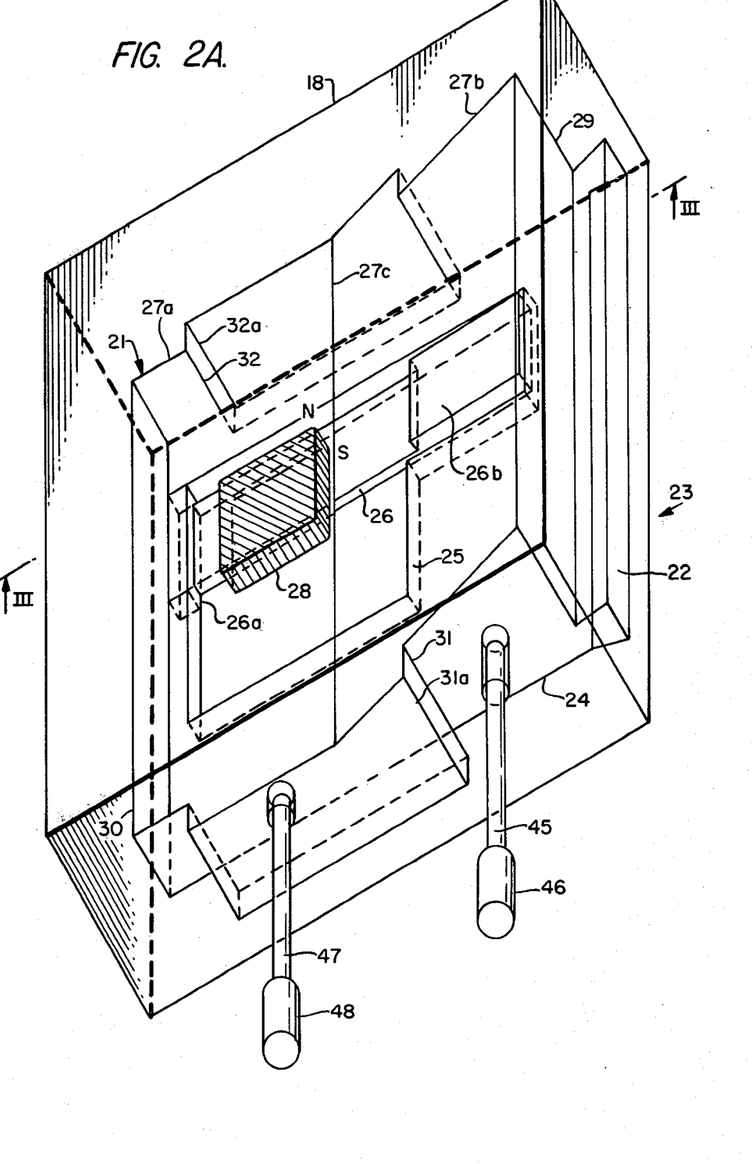
FIG. 2A is a perspective view of a connector case in accordance with the invention matching the card illustrated in FIG. 1, the outer sections of this case being illustrated by wide solid lines and the internal sections by thin lines to promote an understanding of this figure.
Figure 2B:
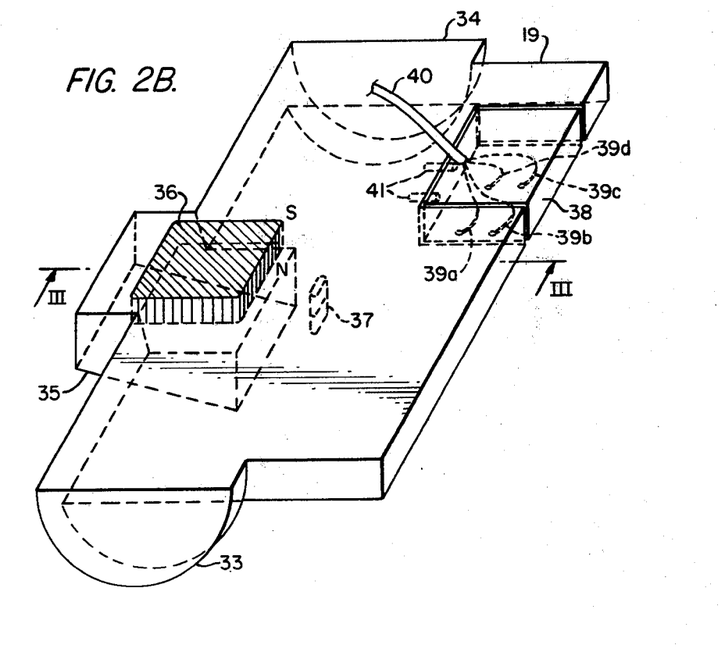
FIG. 2B is a perspective view of the member forming a rocker which is normally inserted into the chamber of the connector illustrated in FIG. 2A.

FIGS. 2A and 2B illustrate in detail the two essential elements 18 and 19 of a connector 29 constructed in accordance with the invention. Elements 18 and 19 are shown integrally in FIGS. 3A, 3B and 3C in various stages of an operation performed with the card 10. The element 18 forms the case of the connector having a chamber 21 comprising an opening 22 adapted to receive card 10 along a predetermined direction of travel, and containing the member 19 arranged to grasp the card as a function of the displacement imparted to the card. The member 19 will be referred to as a "rocker" in the following description and is illustrated in detail in FIG. 2B. Referring to FIG. 2A, case 18 has the form of a rectangular parallelepiped, advantageously fabricated from a light and rigid moldable material such as, for example, a hard plastic material. To simply the description, it will be assumed that the base of case 18 is provided by the opening 22, although it will become readily apparent that the operation of the connector 20 is unaffected by the spatial position of the case 18. Card 10 is inserted horizontally in the direction of arrow 23 through opening 22. Opening 22 matches the cross-section of the card and serves to guide the card into the chamber 21 the general shape of which is also substantially parallelepipedal. The lower side 24 forms the floor of the chamber 21 and is disposed in the embodiment as illustrated, at the same level as the lower internal section of the opening 22, to act as a guide for card 10 as well as a first jaw for enclamping this card. The floor 24 comprises a recess 25 having a part topped by a blade spring 26. One extremity 26a of spring 26 is integral with the floor 24 and a free extremity 26b forms a platform, the lever of which is slightly raised with respect to the floor 24 to form a jaw complementary to the jaw 24 for the purpose of equalizing, despite possible slight variations in thickness between different cards 10, the state of the electrical connections established when each card is appropriately gripped in the connector 20. To this end, platform 26b is normally positioned beneath the wafer 12 of each card 10.

Figure 3:
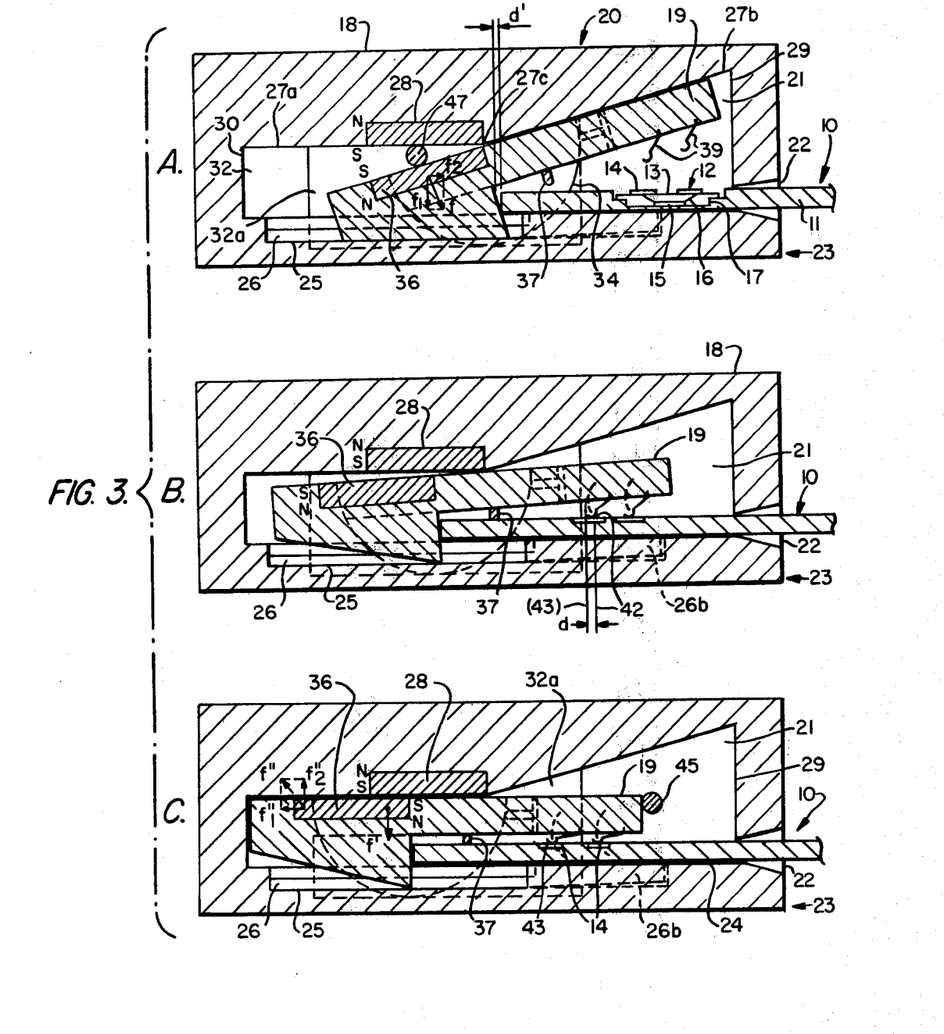
FIG. 3A is a view in cross-section along the line III—III shown in FIGS. 2A and 2B, of the connector formed by the assembly of the case and rocker illustrated in these two figures, with the rocker situated in its idle position.
FIG. 3B is a view analogous to FIG. 3A, but with the rocker shown in an intermedite position between its idle position and its operating position, during the action of insertion or withdrawal of the card illustrated in FIG. 1.
FIG. 3C is a view analogous to FIGS. 3A and 3B, but with the rocker shown in its operating position corresponding to the end of travel setting of the card in the connector, the card then being ready to undergo the required processing of the data contained on the card.

The upper side or ceiling 27 of the chamber 21 comprises two parts 27a and 27b forming a dihedron in which the ridge 27c is at right angles to the direction of insertion of card 10 shown by arrow 23. The ceiling section 27a is horizontal, that is parallel to the floor 24. The ceiling section 27b is a sloping plane which diverges from the floor 24 towards the front of the chamber 21. The section comprising the opening 22 for ingress of the card 10 is conveniently referred to as the front of the connector 20. Furthermore, inset within the horizontal ceiling 27a is a first permanent magnet 28. Magnet 28 is vertically magnetized, north at the top and south at the bottom, in the example illustrated. One surface of magnet 28, as more clearly shown in FIG. 3, is disposed adjacent to the ridge 27c in its median section and the lower surface as viewed in the drawing is contained in the plane of the horizontal ceiling 27a or set back a little from this plane. As for the sidewalls of the chamber 21, the front 29 and rear 30 surfaces are vertical and plane throughout, whereas the sides 31 and 32 each comprise a recess 31a and 32a extending a little below the floor 24.

Referring to FIG. 2B, the rocker 19 acts as a second jaw for gripping the card 10 within the connector 20 and has substantially the form of a rectangular parallelepiped, which is relatively thin. The longitudinal dimension in the direction of the arrow 23 is smaller than that of the chamber 21 and the transverse dimension corresponds substantially to that of the chamber and thus also that of the card. It is advantageously fabricated from a moldable, light and rigid material such as that of the case 18. To this general parallelepipedal shape are added at either side two semicircular discs 33 and 34. Discs 33 and 34 engage, respectively, in the two corresponding recesses 31a and 32a in the side walls of the chamber 21. Rocker 19 also includes, at the rear axial section, a cog 35 projecting towards the base from the rocker so that it is displaceable in the recess 25 in the floor 24 of the chamber 21. In accordance with the form of illustrated embodiment, cog 35 also projects towards the rear from the rocker. In its upper section, cog 35 has inset therein a second permanent magnet 36. Magnet 36 is also magnetized vertically, south at the top and north at the bottom, when the magnet 28 has the configuration shown in FIG. 2A. The upper surface of magnet 36 is contained in the upper plane of the rocker 19 or is set back a little from this plane. Preferably, the surfaces of magnets 28 and 36 are flush with the surfaces 27a of case 18 and plane surface of rocker 19 which is positioned in facing or abutting relationship therewith when the rocker assumes the position shown in FIG. 3C. In front of cog 35 and below the rocker 19 projects a coupling element 37 which in accordance with a particular embodiment of the invention may be fabricated from a material adapted to adhere to a surface of a card adapted to be inserted into opening 22.

The rocker 19 also comprises a contact module 38 equipped with a plurality of contacts. Four flexible contacts 39a–39d in the form of blades are shown in the illustrated embodiment. Contacts 39a–39d are arranged in such manner that their free extremities correspond to the respective configuration of the contact pieces of the wafer 12 (contacts 14a–14d in the illustrated embodiment) with card 10 in the operating position within the connector 20, as shown for example in FIG. 3B. The other extremities of the contact blades 39 are adapted to be connected, respectively, to a data processing system (not illustrated) via electrical conductors, which are partly imbedded in the module 38 and combined into an outer cable 40. Furthermore, the module 38 is removable, meaning that it may be plugged into the block forming the rocker 19 by means of two pins 41. It should be apparent that contact blades 39 could form an integral part of the block forming the rocker 19.

The operation of connector 20 is best illustrated by FIGS. 3A, 3B and 3C. In FIG. 3A, the rocker 19 is in its idle position, which is the stable position it normally assumes when the card 10 is absent or positioned without as yet acting on the rocker, as illustrated. The stability of this position is attributable, on the one hand, to the fact that the cog 35 bears wholly on the bottom of recess 25, while the upper surface of rocker 19 abuts and is partly in contact with the sloping ceiling 27b, and to the fact that the semicircular discs 33 and 34 are brought into abutment against the front surfaces of the recesses 31a and 32a of the chamber 21, and on the other hand to the action of the magnets 28 and 36 which, being positioned in mutual confrontation, exert a repulsive force f. Force f comprises or may be said to be divided into a vertical force f1 which causes the lower side of the cog 35 to be held against the bottom of the recess 25 and a horizontal force f2 which acts to keep the semicircular discs 33 and 34 in abutment against the front surfaces of the recesses 31a and 32a. The vector force diagram is illustrated in FIG. 3A. The same actions would be obtained if the impingements between the semicircular discs and the front surfaces of the recesses were to occur between the front of the cog 35 and the duly positioned front surface of the recess 25, or else between the front surfaces of the rocker 19 and of the chamber 21. Analogously, apart from these impingements, it is sufficient for the cog 35 to rest on the bottom of the recess 25 or for the rocker to be in contact with the sloping ceiling to have the stability required.

Let it now be assumed that an operator inserts a card 10 into the connector 20 in the direction of the arrow 23. The operating edge of the card first impinges against the cog 35 of rocker 19 as depicted in FIG. 3A, then pushes the rocker 19 backwards towards the rear of the chamber 21 (FIG. 3B). It is apparrent from FIGS. 3A and 3B that rocker 19 moves back in a direction parallel to the direction of the arrow 23 by virtue of the fact that the semicircular discs 33 and 34 are impelled by the repulsive force of the magnets 28 and 36 to slide along the guiding tracks formed by the lower horizontal surfaces of the recesses 31a and 32a. At the same time, the rocker 19 tips around the ridge 27c of the ceiling, thus coming closer to the card. FIG. 3B shows the situation at the instant in which two contact blades (39a and 39d) come into initial contact at points 42 with corresponding contact elements (14a and 14d) of card 10. It will be noted on the other hand that the coupling element 37 of the rocker 19 comes into engagement with the upper surface of the card 10 when the rocker moves backwards. Since coupling element 35 is adhesive, the position of the card relative to the rocker is stabilized. Other forms of coupling or stabilization means may be employed.

Upon continuing to push on the card 10, the operator finally feels a stoppage or resistance to any further insertion of the card. This stoppage indicates that the rocker 19 is in its final operating position when in FIG. 3C. Upon following the sequence from the position shown in FIG. 3B, it will be observed that the stoppage is caused by impingement of the semicircular discs 33 and 34 against the rear surfaces of the recesses 31a and 32a of the chamber 21, and by the impingement between the rear surfaces of the cog 35 and of the chamber 21. Impingement at one of the two locations is sufficient to prevent further insertion of the card. At this position of the rocker, all contact blades 39 are applied on or in contact with the corresponding output terminals 14 of the card 10. The approach of the rocker 19 towards the card 10 from the position shown in FIG. 3B faces the contact blades 39 to pivot about their fixed extremities along approximately an arc of a circle as illustrated in FIGS. 3B and 3C. In this way, the free extremities of the blades finally make a forced or biased contact with elements 14 at points 43 spaced apart slightly from the points of the initial contact 42 by a distance "d" as illustrated in FIG. 3B. This distance "d" is representative of the variation of the cosine of the angle of pivotal displacement of the blades. As a result of the pivotal displacement of the blades, a self-cleaning action occurs on the output terminals of the card 10 when the card is inserted into connector 20. Furthermore, it will become apparent from the following description, particularly in connection with the embodiments of the invention shown in FIGS. 6A, 6B, 7A and 7B, that this variation inherent in the contact blades may be augmented by a slight variation "d" intrinsic to the rocker, depending on the form of the front surface of the cog with respect to that of the operating edge of the portable object, so that depending on its thickness and tipping angle, a self-cleaning action will occur in particular cases with so-called piston-type retractable contacts 14.

In the form of embodiment illustrated in FIGS. 3A–3C, the operating position of the rocker shown in FIG. 3C is a stable position. Stabilization is advantageously provided by the two magnets 28 and 36 arranged and organized or disposed in such manner that, in this position, the magnet 36 retains a portion of its plane exposed surface in confrontation with a portion of the exposed plane surface of magnet 28, the abutting relationship of these surfaces in this position causes generation of a vertical repulsive force f'. Apart from these abutting surfaces, attractive forces f" are generated because of the existing magnetic fields and the attractive flux between the south pole of the clear or exposed upper surface of element 36 and the north pole of the upper surface of the element 28. These attractive forces have as their resultant the force f" vectorally illustrated in FIG. 3C. The horizontal component $f''_1$ represents a force component which serves to hold the rocker 19 against the rear side 30 of the chamber 21. The vertical force component $f''_2$ combines with the repulsive force f' to develop a torque whose action is to pivot the rocker 19 about discs 33, 34 such that the rear of the rocker is forced toward the top of the connector and the front of the rocker is forced toward the card 10, thus intensifying the contact of the blades 39 with the output terminals 14 of the card. The advantage of the magnets as a stablizing device for both the idle and operating positions of the rocker consists on the one hand in that they may be integrated very satisfactorily within the case and rocker of the connector 20, and they do not require a mechanism which is fragile and complicates the structure and operation, and on the other hand in that the stabilization they engender may be devised in such manner as to be quasi-independent from the spatial position of the connector. In its practical application, it is advantageous for the center of thrust of the contacts 14 of the rocker 19 to be a little behind the ridge 27c of the ceiling of the chamber 21.

Since the card 10 is in engagement with the coupling member 37 starting from a position close to the idle position and up to the operating position, the operator needs merely to pull the card in the opposite direction to that of the arrow 23 to entrain the rocker 19 with it. As the card is withdrawn, the coupling member 37 will be separated from the card close to the idle position by the action of the magnets 28 and 36 which then act to place and hold the rocker in its idle position.

It should be apparent that, in particular cases of application of a connector in accordance with the invention, the stabilization of the rocker in its operating position may be optional or undesirable, as in the case of an obliteration operation. Here again, the magnets 28 and 36 could be of such rating and arrangement that their action on the rocker in its operating position is practically equal to nought or opposed to that illustrated in FIG. 3C. In the latter case, the coupling member 37 could be omitted since the rocker would still tend to regain its idle position.

Regarding the coupling element 37 for effecting coupling by adhesion between the rocker 19 and the card 10, this represents only one possible form of embodiment. Another embodiment of this device might consist in a rigid peg which would cooperate with a hole in the card, like the hole 44 illustrated in FIGS. 1 by a dash line symbolizing the peg hole version of embodiment. It would also be possible to utilize a suction cup effect. Thus, it should be understood that when reference is made to an adhesion coupling between rocker 19 and card 10, it means to include mastic, mechanical, magnetic and other forms of coupling frequently used to join two members which are brought into contact for sliding movement together and which may thereafter be separated by reverse movement.

Although such known coupling members actually can weather the sliding action such as that of rocker 19 and card 10 without damage, the situation is different, however, for contacts and wafers wherein a substrate includes terminals that are relatively thin and fragile. In accordance with the present invention, the semicircular discs 33 and 34 constantly hold the rocker on the case 18 of the connector and thus adapt the latter more satisfactorily to the credit cards 10 while endowing them with greater durability because of a lesser variation (thanks to improved control) of the contact and self-cleaning forces exerted by the contact blades 29 on the contact pieces 14. This advantage is further enhanced by the dihedral form of the ceiling which averts the addition of devices which are equivalent and more complex, fragile and expensive, as well as less impervious to attrition. It should be apparent, however, that the dihedral ceiling 27 illustrated represents a particular form of embodiment, this ceiling being liable to be formed in considerable proportion by a convex surface. On the other hand, although not illustrated in the drawings, the ceiing 27 normally comprises a groove in the direction of the arrow 23 to accommodate the cable 40 (FIG. 2B) which then emerges normally from the connector 20 for its connection to a data processing system which is not illustrated.

Other modifications could be made in the illustrated connector 20. For example, it is apparent from FIGS. 3A–3C that the dihedral form of the ceiling 27 of the chamber 21 forms a means of guiding the rocker 19 between its idle and operating positions. It can easily be envisaged, however, that it would be possible to secure the same displacements of the rocker with a guiding device independent of the ceiling. For example, guiding rails may be situated on the sides 31 and 32 of the chamber and arranged to cooperate with the rocker, via slideways. In this case, the semicircular discs 33 and 34 of the rocker could be omitted and the corresponding guiding tracks 31a, 32a could also be replaced by rails or omitted, the surface of the card and its displacement being sufficient to entrain said rocker. In such case, the distance between the floor of the chamber and the lower surface of the rocker would no longer be maintained at a predetermined value, because a reliable contact is otherwise assured. It will be recalled that the entrainment of the rocker is performed by means comprising the abutment formed by the front surface of the cog 35 for receiving the card 10 and the coupling member 37. In the form of embodiment selected, the stop is advantageously well integrated in the lower surface of the cog 35 which serves the purpose of stablizing the rocker in its idle position. Nevertheless, depending on the stabilization method selected, the cog 35 could be restricted to an abutment surface for the card. Other elements may be added to the connector 20. In the case of its application to credit cards and use with automatic teller or bank machines, consideration should be given to prevent the operator from cheating by opportunely withdrawing his card before it is debited with the cash supplied by an automatic teller machine for example. To prevent such a fraud, means are provided to lock the rocker in its operating position until completion has occurred of all operations with the electronic device 15 contained in the card 10 (FIG. 3A). To this end, FIG. 2A illustrates a locking device of this nature in the form of a plunger core 45 controlled by an electromagnetic coil 46 whose supply is controlled by the data processing system which is not illustrated. The coil 46 being energized, the plunger core 45 is positioned in front of the rocker in its operating position (FIG. 3C) so that it retains the card 10. The plunger core could alternatively be installed above the front of the rocker to prevent the latter from tipping around the ridge and from thus releasing the card. Furthermore, it may be desirable or required for the rocker to be locked in its idle position to prevent any insertion of the portable object or card, as, for example, in the case in which the cooperating data processing system were to be out of service. In the form of embodiment illustrated in FIG. 2A, this locking device is analogous to the first, that is to say formed by a plunger core 47 actuated by an electromagnetic coil 48 which may be energized by the data processing system. The free extremity of plunger core 47 is inserted between the rear upper surface of the rocker 19 and the horizontal ceiling 27a as shown in FIG. 3A, thus locking the rocker in rotation.

The connector 20 which has been described could equally undergo substantial modifications depending on its application and on the form of the portable object. It is apparent from the specification that the connector is adapted for coupling interconnection of substrates of electronic devices illustrated in the form of cards, wherein the output terminals are carried on the card. Where the terminals are arranged on the operating edge, it would only be necessary to arrange the electrical contact elements of the rocker accordingly. The portable object may also have a cylindrical or semi-cylindrical shape since it would only be necessary to establish a match with the shape of the lower surface of the rocker. On the other hand, the ceiling and the top surface of the rocker may be incurved transversely to the direction of operation, so that both may at least partially match the form of a cylindrical object, for example. The views in longitudinal cross-section of FIGS. 3A–3C would actually remain practically unaltered, as would the operation of the rocker. Analogously, the floor 24 could also be matched to the shape of the portable object. It should also be readily apparent moreover that it is of little importance whether the rocker comprises electrical contact elements or not. For example, the connector could be utilized for cancelling or imprinting a ticket by means of the rocker itself, or by a pad which would be actuated at the instant in which the rocker assumes its operating position. In this instance, a contactor could be added for actuation of the pad. Thus, its use in conjunction with credit cards is only one application of the device. It should be equally apparent that the magnets 28 and 36 represent no one particular form of embodiment of a stabilizing device. In more generalized fashion, any means of establishing stabilization by means of an influence without a material connection between the case and the rocker, may be advantageously provided. In all such versions, a connector in accordance with the invention has the advantage over the connectors of the prior art, of easily being made portable by virtue of its small bulk, its low weight, and of its strong and uncomplicated structure, and the fact that the only moving part of the connector is the rocker which furthermore lacks an axis common with the case. Furthermore, its operation and application is elementary since it is only necessary for the operator to push in or draw out the portable object with practically no effort. More importantly, the connector performs a self-cleaning action on the output terminals of the portable object in the case of a credit card of the type described. Such a connector is quasi-universal, meaning that its applications may extend to a great number of portable objects as should be apparent from the foregoing. The connector is extremely durable and prototype of the connector illustrated withstood 500,000 operations without damage.

Figure 4:
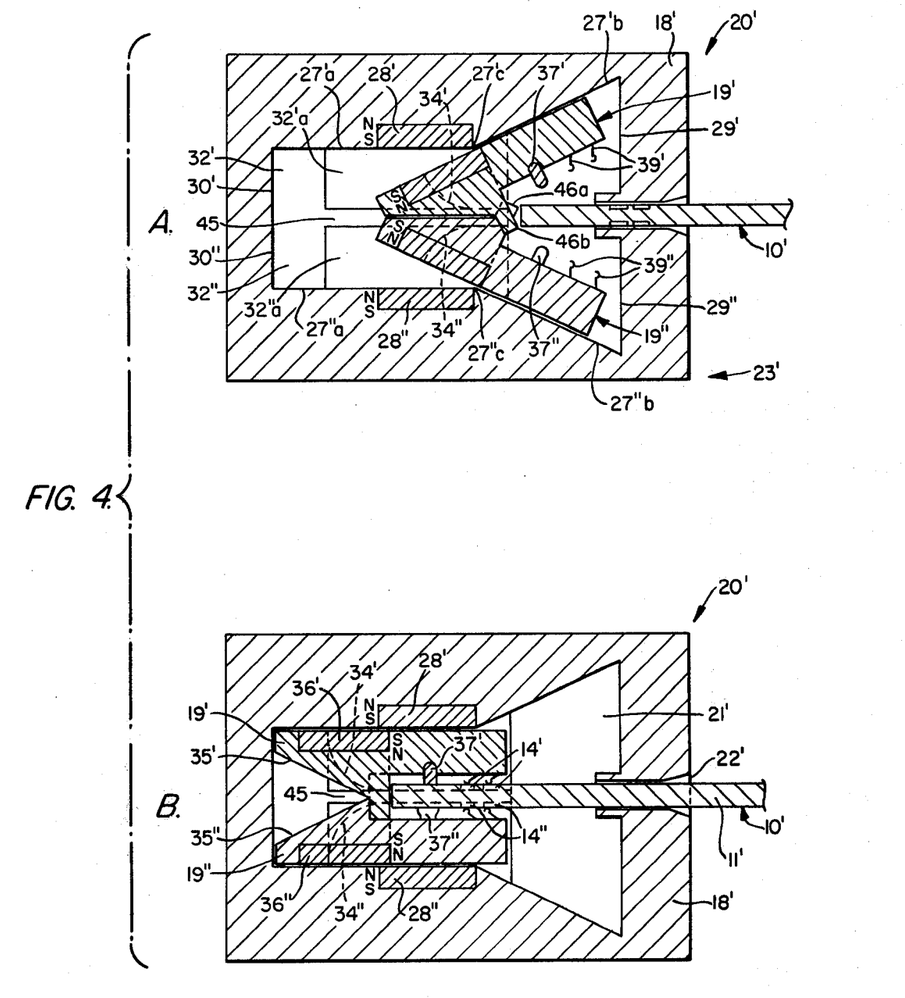
Figure 5:
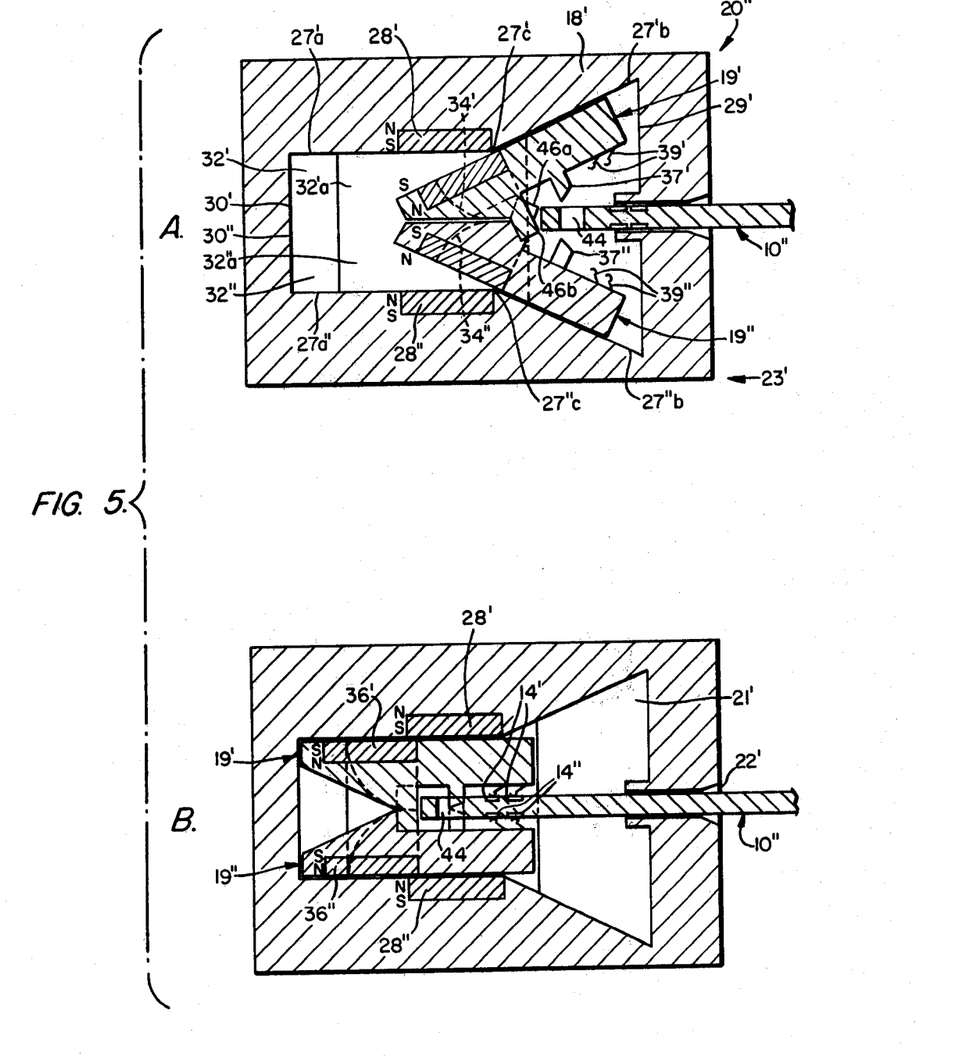
FIG. 5A and FIG. 5B, FIGS. 5A and 5B illustrate, in analogous manner to that of FIGS. 4A and 4B, a modified embodiment of the connector illustrated in FIGS. 4A and 4B.

In views analogous to those of FIGS. 3A and 3C, FIGS. 4A and 4B illustrate a modified embodiment of a connector in accordance with the invention, whereas FIGS. 5A and 5B show a modified embodiment of the connector illustrated in FIGS. 4A and 4B. Given that the two connectors illustrated in FIGS. 4 and 5 have substantially the same components as the connector ilustrated in FIGS. 2 and 3, identical parts are denoted by the same reference numerals, but marked by one or two accents.

The two connectors illustrated in FIGS. 4 and 5 are particularly adapted for use in conjunction with portable objects in the form of credit cards 10' of a kind analogous to the credit card 10 depicted in FIG. 1, but which has electrical output terminals 14' and 14" respectively, on both its principal surfaces. The FIGS. 4A, 4B and 5A, 5B illustrate only the conductive elements representative of the said output terminals without illustrating the IC device for processing the data incorporated in the card. It will be apparent, however, that the card to be lodged in the case incorporates one or more integrated circuit devices having output elements on two opposed surfaces, as described, for example, in the aforenoted U.S. Pat. application Ser. No. 69,253. Thus, the card may carry in one and the same hole or in two different recesses, two wafers analogous to the wafer 12 illustrated in FIG. 1. The symmetrical arrangement of the contact elements 14' with respect to the contact elements 14" represents no more than a particular case, and the positial relationship of the contact elements is arranged to cooperate with spring contact blades of the cooperating rocker element or elements as the case may be.

The connector 20' illustrated in FIGS. 4A and 4B is a version of the connector 20, adapted for the card 10'. It thus comprises a case 18' which in one chamber 21' houses two rockers 19' and 19". The chamber 21' has as its plane of symmetry the operating plane of the card 10' passing through the opening 22'. In other words, as compared to the connector 20, it may be stated that the chamber 21' is the result of juxtaposing two identical chambers 20, having the plane of operation of the card as their common floor. It will also be stated that the chamber 21' is delimited by two front surfaces 29', 29" separated by the opening 22'; by two common rear surfaces 30', 30"; two common surfaces 32', 32" at the right-hand side of the connector as seen from the front; two common surfaces at the left-hand side (not illustrated in view of the median cross-section of the connector 20' as illustrated in FIGS. 4A and 4B) which are analogous to the surfaces 32' and 32" and which would be marked by 31' and 31" in correspondence with the sides 31 of chamber 21 of the connector 20; and two identical sides, being a lower and an upper one, respectively comprising two surfaces 27'a, 27"a parallel to the operating plane of the card, and two surfaces 27'b, 27"b diverging from the operating plane starting from two lines 27'c, 27"c forming ridges for the dihedrons formed by these sides. Horizontal surfaces 27'a and 27"a have inset, respectively, permanent magnets 28', 28" each having a vertical magnetization. The surfaces of magnets 28', 28" looking towards the chamber 21' are adjacent in this instance to the ridges 27'c, 27"c in their median section and the free or open surfaces of the magnets are contained in the planes of the corresponding surfaces 27"a, 27"a, or are set back a little from these planes. The lateral surfaces 32', 32" include recesses 32'a, 32"a. According to a feature of the connector 20', however, these recesses are delimited by a web 45. The same certainly applied in respect of the other sidewall which is not illustrated.

The rockers 19' and 19" are analogous to the rocker 19 of the connector 20. Thus, they comprise, respectively contact blades 39', 39", coupling elements 37', 37", cogs 35', 35", disc sections for the right-hand side 34', 34" and for the left-hand side 33', 33" (not illustrated), and permanent magnets 36', 36" disposed in and situated before the lower and upper sides in identical manner to that of the rocker 20. The disc sections 34', 34" (like those 33' and 33" which are not illustrated) are quarter-circle discs in this case instead of semicircular discs, without this being significant as regards their function. They are housed in the corresponding recesses 32'a, 32"a (31'a, 31"a) and are impelled to slide on guiding tracks formed by the two horizontal edges of the webs 45. The magnets 36', 36" are also magnetized at right angles to the surfaces of the rockers which cooperate with the upper and lower sides of the chamber 21' and in such direction that their magnetic fields exert repulsive forces with respect to the fields generated by the corresponding magnets 28' and 28", tending to apply the cogs 35', 35" against each other when the rockers 19', 19" are in their idle position illustrated in FIG. 4A. In this figure, the location of the magnetic fields has moreover been selected judiciously, in such manner that the idle setting of the rocker is reinforced by the forces of attraction exerted between the magnets 36' and 36", in adjacent rockers 19' and 19" as illustrated. Finally, like the rocker 19, the rockers 19' and 19" comprise abutment devices for receiving the operating edge of the card 10', these abutment devices being formed by the front edges of the cogs 35' and 35" which, respectively, form complementary interfitting teeth 46a, 46b forming a hinge one with the other.

The operation of the connector 20' corresponds precisely to that of the connector 20 as illustrated in FIGS. 3A, 3B and 3C. As for the rest, FIGS. 4A and 4B correspond to FIGS. 3A and 3C, respectively. In the initial condition, the rockers 19' and 19" are in a stable idle position due to the fact that, on the one hand, the opposed magnetic forces between the magnets 28', 28" and 36', 36" have the result of pushing the rear of one of the rockers against the other rocker, this action being reinforced by the forces of attraction between the magnets 36' and 36", and, on the other hand, the disc sections 33' and 34' come into abutment against the front surfaces of the recesses 31'a and 32'a of the chamber 21' and that the rockers bear on the sloping sections 27'b, 27"b of the lower and upper sides of the chamber. The same results would be secured if the impingement between the disc sections and the front surfaces of the recesses were to occur between the front surfaces of the rockers and of the chamber. As for the rest, in the example illustrated, the bearing surfaces 27'b and 27"b would be sufficient to establish the required stability without intervention by the abutments.

Let it now be assumed that an operator inserts the card 10' (FIG. 4A) into the connector 20' in the direction of the arrow 23'. The operating edge of the card first impinges against the teeth 46a and 46b, which may take the form of interdigitating tooth members. Continued movement of the card inward pushes the rockers towards the rear of the chamber. Due to the repulsive force of the facing magnets, the disc sections 33' and 34' are caused to slide along the supporting rails 45. At the same time, the rockers tip around the ridges 27'c and 27"c, thus bringing their contacts 29', 29" closer to the contact elements 14', 14" of the card and placing the coupling elements 37' and 37" in 37' and 37" in engagement by adhesion with the two opposed surfaces of the card. Upon continuing to push on the card, the operator finally feels a stoppage, which means that the rockers 19' and 19" are in their final position, referred to as the operating position (FIG. 4B). This operating position is, in the example illustrated, a stable position established by the forces of attraction which prevail this time between the magnets 28' and 36' on the one hand, and 28" and 36" on the other hand, as well as by the impingement between the disc sections and rear surfaces of the recesses and/or the rear surfaces of the rockers and of the chamber. To free the card, the operator need merely exert a slight withdrawal force in the direction opposed to that of the arrow 23'. Simultaneously as the card is withdrawn the rockers are restored to their idle position. The advantages of the connector 20' are the same as those of the connector 20. Namely, the direct impingement of the contacts on the output terminals of the card prevents practically all wear of these elements and is adapted to connect output terminals which are distant from the operating edge of the card. Because of the flexibility of the contact blades 29', 29" and of the varying slope of the teeth 46a and 46b, it is possible to adjust the stroke of the contact blades on the output elements 14', 14" of the card to perform a self-cleaning action on these output elements. The structure and method of application are very uncomplicated, and a connector of this kind may be adapted for all kinds of portable objects, be it for the purpose of an electrical connection or for the purpose of simple mechanical coupling, such as might be required, for example, for date stamping or cancelling of fare tickets or the like. Like the connector 20, the connector 20' may undergo substantial modifications without altering its principle of operation. FIGS. 5A and 5B illustrate a connector 20" which has undergone some of these modifications. Because of its similarity to the connector 20', the same reference numbers denoting the same components have been retained. Recesses 32'a, 32"a no longer comprise rocker supporting rails (like, evidently, the opposed recess surfaces 31'a and 31"a). Rather, in the connector 20", the disc sections 34', 34" are adapted to bear on each other without slipping. During an operation, they consequently perform a simple rotating through an angle equal to that of the tipping displacement of the members 19' and 19".

As another embodiment, it will be noted that the connector 20" is adapted for cards 10" equipped with at least one hole 44 (like the card 10 illustrated in FIG. 1) serving the purpose of receiving at least one of the coupling elements 37', 37" appearing in the form of a rigid peg, which may be produced integrally with the corresponding rocker element. An embodiment which is not illustrated, envisions the guiding device for each rocker being formed by each dihedron-shaped side of the chamber 21', and may in generalized manner be a surface of convex shape in the direction of the arrow 23' which cooperate with a rocker surface which is not incurved in this direction. It is evident that such guiding means could consist in equally convexly-shaped guiding rails. Moreover, the contact elements of the rockers could be retractable elements (of the piston-type, for example) or flexible elements other than those illustrated, for the purpose of securing an efficient self-cleaning action on the output terminals of the portable object. It is apparent, however, that rigid contacts may also be provided. FIGS. 6A and 6B are detail fragmentary views of the connector 20 as shown in FIGS. 3B and 3C, diagrammatically confined to the vicinity of a contact element to demonstrate the components playing a part in the self-cleaning action with a connector of this type. FIGS. 7A and 7B transferred, respectively, over FIGS. 6A and 6B, illustrate a contact element having an improved self-cleaning action. It should be apparent from reference to FIGS. 3A, 3B and 3C, that the application of flexible contacts having a free extremity, results in a self-cleaning action on the output terminals of a credit card having a chip thereon with exposed contact elements as a consequence of the rubbing action of the free extremities of the contacts on the corresponding terminals of the card upon insertion or withdrawal of the latter into the connector. As illustrated, the flexible blades 39 are linear blades having a fixed extremity in unit with or affixed to the rocker, and a free extremity directed towards the bottom of the chamber housing the rocker and equipped with a rounded-off projecting contact area to establish the electrical connection between the rocker and the card while the card is positioned in the operating position. It has been shown that with this kind of contact, the stroke of the free extremity over the corresponding output terminal varies like the cosine of the angle of pivotal displacement of the contact around its fixed extremity.

FIG. 3A furthermore discloses the presence of a variation d' of the relative position between the portable object and the rocker, wherein the amplitude is a function of the angle of rotation of the rocker and of the form of the mutually confronted surfaces of the operating edge of the portable object and of the cog of the rocker. These surfaces commonly being plane, the effective variation d" between each contact and the corresponding output terminal of the card then depends on the thickness of the card and on the angle of rotation of the rocker between the instant of impingement of the contact on the output terminal and the instant in which the object is in its final operating position. It would obviously be advantageous for the variation to be in addition to the variation of the cosine of the angle of pivotal displacement of the contact to enhance the efficiency of the self-cleaning action. The actions of these two variations are unfortunately not additive in the arrangement of the contacts blades depicted in FIGS. 2B and 3A to 3C, so that the self-cleaning action depends only on the pivoting of the contact blades on their respective fixed extremities. Another advantageous feature of the invention provides a rocker equipped with flexible electrical contact elements whose corresponding free extremities are intended to make contact with the corresponding output terminals of a portable object, such as a credit card having a chip carried therewith. To this end, when the rocker is in its idle position, the free extremity of each of the contact blades are directed towards the opening through which the card is inserted and rest on the output terminals.

The application of a contact comprising a straight blade is not always satisfactory. For example, the advantage of using a credit card of the kind illustrated in FIG. 1, specified in particular in the aforenoted U.S. Pat. application Ser. No. 4,588, consists in that the output terminals may be contact pieces of a very small area, concentrated within a small section of the card. If the contact pieces are practically adjacent in the direction of manipulation of the card within the connector, the required mutual approach of the straight contact blades in question risks shorting between the contacts or of diaphony in the signals they transmit. On the other hand, considering the variations arising in the tolerance limits of the thickness of the portable object and of the angle between the contacts at rest and the rocker, the length of the stroke of the contact on the terminal and the thrust exerted on the terminal by the contact vary proportionately. Obviously, it is desirable that a contact should provide a connection which is reliable, practically unaffected by the normal variations of the conditions related to application of the connector. These shortcomings may be cured by providing each contact with a curved section wherein the inner surface is turned towards the opening of the connector, as shown, for example, in FIGS. 7A and 7B. The resilient bow from the curved section absorbs the stresses while maintaining the thrust of the contact on the terminal at a predetermined value and adapts itself more satisfactorily to variations in thickness of the portable object, which may exist if the object or card does not meet the aforenoted IOS/DIS standard specification. The features and advantages of this embodiment will be clearly apparent from the following description given with reference to FIGS. 6A, 6B and 7A, 7B.

In FIGS. 6A and 6B relating to the connector illustrated in FIGS. 3B and 3C, the rocker 19 is equipped with cog 35 against which bears the operating edge of a credit card 10 as illustrated in FIG. 1. The card 10 comprises four conductive contact pieces 14a-14d forming the electrical output terminals of the card, whereas the rocker 19 comprises four contact blades 29a-29d intended to cooperate respectively with the output terminals 14a-14d when the card is in at least its operating position in the connector. To simplify the explanation of the self-cleaning action engendered by a connector of this kind, the contact between the output terminal 14d and the contact blade 39d has been taken as an example in FIGS. 6A and 6B, as depicted in analogous manner in FIGS. 3B and 3C, whereas the proportions have been exaggerated selectively for clearer emphasis on the causes and actions of the self-cleaning effect.

Figure 6:
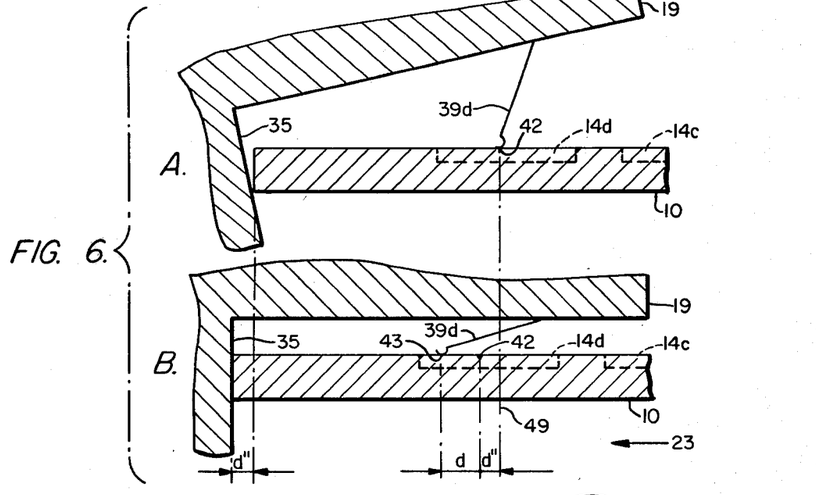
FIG. 6A is a fragmentary view in detail of the connector illustrated in FIG. 3B partially illustrating the rocker and the credit card close to a contact blade when the latter "lands" on the corresponding output terminal of the card and FIG. 6B is a fragmentary detail view analogous to FIG. 6A and corresponding to FIG. 3C, illustrating the final operating position of the card within the connector.

The contact blade 39d has a fixed extremity affixed to the rocker 19, and a free extremity directed inward toward the cog 35 of the rocker 19. The free end is equipped with a rounded projecting contact area and in the embodiment of FIG. 6 is intended to provide the electrical connection with the terminal 14d prior to the pivoting of the contact on its fixed extremity, i.e. when card 10 is first inserted completely, but before the rocker is moved. In FIG. 6A, contact is not established until after the rocker is moved. The contact blade 39d lands on the output terminal 14d at a point 43 when the card 10 has been set at its operating position (FIG. 6B) at the limit of insertion into the connector in the direction of the arrow 23. Since an angle is necessarily present between the cog 35 of the rocker and the operating edge of the card 10 at the instant of impingement of the contact blade on the card, the tipping of the rocker 19 as far as its final operating position introduces a displacement of a magnitude d". To summarize, if the point of impingement 42 of the blade on the output terminal is taken as a reference point, as shown by the dash-dotted line 49, the point 42 is consequently displaced by the distance d" when the card is in its operating position (FIG. 6B), so that the stroke d of the extremity of the contact blade 39d on the terminal 14d, between the points 42 and 43, is unaffected by the displacement d". It follows that it is smaller by the value of the displacement d" than the distance separating the line 49 from the point 43 and that obtaining a longer stroke d requires a proportionately longer contact. However, the longer the contacts, the farther they should be spaced apart so that their mutual approach during their pivotal displacement does not engender shorting between them, nor diaphony in the signals transmitted. Furthermore, it should also be apparent from FIGS. 6A and 6B that if the terminal 14d were to be lower (for example, because of a thinner card 10), and/or if the angle present between the contact 14d at rest (FIG. 6A) and the rocker 19 were to be smaller (all this within the tolerance limits), the length d and the pressure exerted by the contact on the terminal would be reduced accordingly, causing a proportional change in the efficiency of the self-cleaning action. Finally, it will be observed that the relative speed between the contact blade and the output terminal is equal to the speed at which the operator inserts the card into the connector. By way of example, FIGS. 7A and 7B illustrate a system comprising a contact in accordance with an additional feature of the present invention, and have been drawn analogous to FIGS. 6A and 6B so as to emphasize the features and advantages of the improvement. Contact 39′d has in common with contact 39d the fact that it is a flexible blade having one extremity affixed to rocker 19 and one extremity free and intended to come into contact with a conductive contact piece 14d. In the layout shown, the innner extremity 50a is removably installed within the rocker element 19. To this end, end 50a may pass through a locating opening 51 provided in rocker 19, and a retractable stud 50b is provided on extremity 50a which bears on the inner side of a rebate or recessed wall 52, close to the opening 51. An electrical connection to a corresponding wire 40d of the cable 40 illustrated in FIG. 2B is established in this case by means of a solder bead 53 of the tin-lead type. The wire 40d is preferably a flat, pliable and marked cable, and the connection is made within the rebate 52. At the other end, the free extremity of the blade 50 forming the contact 39′d has a rounded contact area 50c like the contact 39d.

The principal feature of the improved contact consists in that its free extremity terminating in the contact area 50c is directed towards the opening 22 of the connector 20, that is to say in the opposed direction to that of the cog 35 shown by the arrow 23. A subsidiary feature of the contact 39′d is that it comprises a curvature 50d wherein the outer surface faces towards the supporting surface of the cog 35, and the internal surface is consequently turned towards the opening of the connector. In FIG. 7A, the curvature is at its idle position and has a substantially semicircular shape, having the center 0 and the diameter 2r. Moreover, the curvature is extended at either end by substantially rectilinear sections 50e and 50f between, respectively, the contact area 50c and the internal extremity 50a. As shown, the section 50f preferably bears at least partially, via a section 50g, on a flange 54 of the element of the rocker 19.

Figure 7:
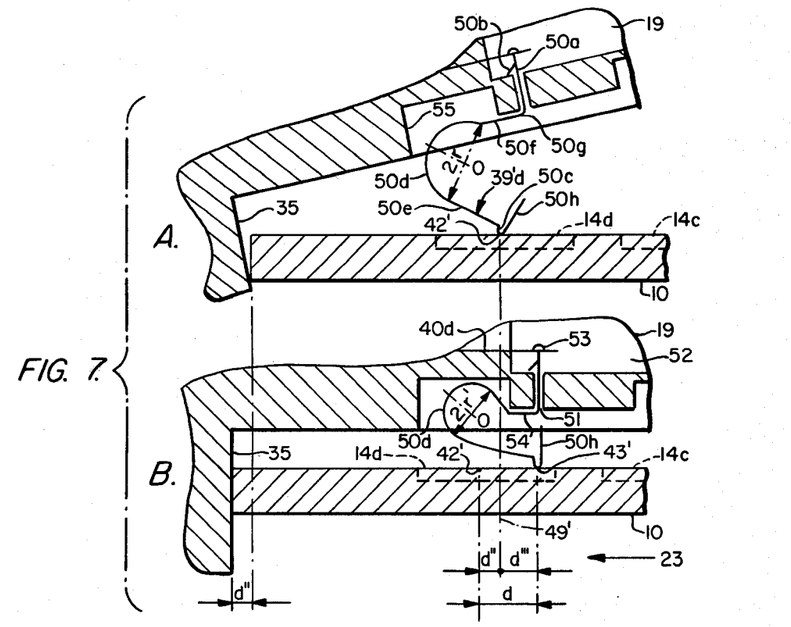
FIG. 7A and FIG. 7B, FIGS. 7A and 7B are detail fragmentary views analogous, respectively, to FIGS. 6A and 6B, but wherein the rocker carries a contact having a curved surface.

In the present case, the rectilinear section 50e, together with the contact area 50c, forms the free extremity of the contact. The flange 54 is adjacent to a recess 55 formed in the rocker 19 so that it may freely receive the curved section 50d, notwithstanding the idle and operating conditions assumed by the contact 39′d. Finally, the contact area 50c is extended by an extreme straight section 50h, directed back towards the rocker and of sufficient length to come into abutment on a surface of the rocker. In the same manner as FIGS. 6A and 6B, FIGS. 7A and 7B show the manner in which the self-cleaning action on the terminals is performed by the corresponding contacts. An exaggeration of the proportions also allows of a clearer elucidation of the causes and results of the self-cleaning action. At rest, the contact 39′d having the form shown in FIG. 7A is positioned at a point 42′ on the corresponding terminal 14d of the card 10. As in FIGS. 6A and 6B, this point will provide a reference for the relative displacement between the contact and the card. The line 49′ drawn dash-dotted denotes this reference. By continuing to push the card 10 in the direction of the arrow 23, the operator continues to cause pivotal displacement of the rocker 19 and thereby tends to compress the blade 50 of the contact 39′d until the condition shown in FIG. 7B is obtained. In this state, corresponding to the operating position, the contact area 50c is positioned at a point 43′ spaced apart from the reference line 49′ by the distance d‴. On the other hand, as in the case of FIGS. 6A and 6B, card 10 has a displacement of a magnitude of d″, causing an identical translatory displacement of the point 42′ with respect to the reference line 49′. It should be noted that, in this case, the length of the stroke d causing self-cleaning of the terminal 14d derives from the combination of the displacement d″ with the displacement d‴ caused by the contraction of the blade 50 of the contact 39′d. This derives mainly from the fact that the free extremity 50e of the contact is directed towards the opening of the connector and, complementarily, that the curved section 50d orientated as shown in FIGS. 7A and 7B impresses a displacement opposed in direction to the direction of the displacement of insertion 23 of the card into the connector on the contact area 50c, while contracting (final diameter 2r′ smaller than the initial diameter 2r). The magnitude of the displacement d″ is evidently a function of the thickness of the portable object and of the form of the surfaces in contact between the operating edge of the object and the cog 35. However, even for a credit card of relatively small thickness, its action plays a part in increasing the required stroke d″ which is equally relatively small, as well as the speed at which this stroke is described. The curved section 50d advantageously absorbs the greater proportion of the stresses orginating from the deformation of the blade 50, the section 50f undergoing practically no angular variation with respect to the section 50g which bears on the surface 54 of the rocker. Further, the effective self-cleaning length d and the presssure exerted by the contact are less affected, as compared to the straight contact 29d, by the tolerance variations of the thickness of the portable object and of the angle between the free extremity 50e of the contact and the rocker 19, whereas—for equal performance—the bulk of the contact 39′d is smaller, which is propitious to the miniaturization of the electrical elements of the portable object. Furthermore, the fact that the contact area 50c travels in the opposed direction to the direction of the arrow 23 and of the displacement d″, the speed at which the self-cleaning action is performed is equal to the sum of the speed at which the operator inserts the card into the connector (the displacement d″ occurring at this speed) and of the speed of displacement of the contact area 50c with respect to the reference line 49′. The self-cleaning action proves to be more efficient, therefore. The length 50h forms a stop that cooperates with an abutment on the rocker so that the contact blade 39′d is not exposed to abnormally high stresses to preserve its required qualities. The system illustrated in FIG. 7 allows easy replacement of the contact. To this end, all that is necessary is to remove the solder bead 53 and to bend over the stud 50b to extract the inner extremity 50a from the rocker 19 through the opening 51. Finally, it should be apparent that curved contact 50 is equally applicable to a connector comprising a rocker, as in the connector 20, as well as to a connector comprisng two symmetrical rockers, as in the connectors 20′ and 20″.

While several embodiments of the invention have been illustrated and described, it will be obvious to those skilled in the art that variations thereto may be made without departing from the true spirit and full scope of the invention which is defined in the appended claims. Accordingly, it is intended by the appended claims to encompass all such variations.

We claim:

1. A connector adapted to have a portable object having contact terminals on one surface engaged with contact elements within the connector upon insertion of the object therein comprises a case, a chamber within said case, an opening leading to said chamber and adapted to receive said portable object along a predetermined direction, connecting means in said chamber for connecting said contact terminals of said portable object to the contact elements within the connector upon insertion into said chamber, said means adapted to be actuated from a first stable idle position chamber to said opening to a second operating position away from said opening to electrically connect said object to said connector upon displacement of the portable object within the chamber, said connecting means comprising a first jaw, and a second jaw hinged with said first jaw, said contact elements being resilient and having one extremity fixed to said second jaw and its other extremity free, said connecting means further including an abutment on said seond jaw disposed to engage an extreme section of the portable object on insertion thereof into the connector, means for guiding and tipping said second jaw with respect to the portable object as said jaw is caused to be displaced between the said idle and operating positions by insertion of said portable object so as to cause the contact elements of the connector to land onto respective contact terminals of the portable object.

2. A connector according to claim 1, wherein the first jaw comprises a fixed surface section of the chamber.

3. A connector according to claim 1 or 2, wherein the first jaw comprises means for exerting a thrust force from the portable object towards the second jaw, upon insertion of said object into said chamber to effect grasping of said object between said first and second jaws.

4. A connector according to claim 1, wherein said first jaw comprises a surface member within said case, said first jaw being disposed for guiding said portable object upon insertion into the chamber along said predetermined direction.

5. A connector according to claim 1 or 4, wherein the means for guiding said second jaw comprises a curved surface on said second jaw arranged to cooperate with a flat surface of said chamber.

6. A connector according to claim 5, wherein said means for guiding said second jaw comprises at least one rail which cooperates with said curved surface as said second jaw is displaced along said predetermined direction to cause tipping of the said second jaw.

7. A connector according to claim 1 or 4, wherein the means for guiding said second jaw includes means for supporting the said second jaw within the chamber of the connector.

8. A connector according to claim 7, wherein the means for supporting the second jaw comprises supporting rails disposed on opposite sides of said chamber.

9. A connector according to claim 7, wherein said means for supporting said second jaw includes a part of the first jaw.

10. A connector according to claim 1, wherein said second jaw has a rear portion and said first means further includes retention means for supporting the said rear portion of the second jaw on the first jaw.

11. A connector according to claim 10, wherein said retention means comprises means for restraining displacement of said second jaw in said predetermined direction.

12. A connector according to claim 10 or 11, wherein said retention means comprises first and second magnetization means carried respectively, by the second jaw and a first surface section of the chamber adjacent to said second jaw, and said first and second magnetization means being disposed one with respect to the other to exert magnetic forces for stabilizing the second jaw in both the idle and operating positions.

13. A connector according to claim 12, wherein said first and second magnetization means exert, one with respect to the other, magnetic forces of attraction in at least the said idle position.

14. A connector according to claim 13, further including means cooperating with said first and second jaws for retaining the first and second jaws in the operating position.

15. A connector according to claim 1, said connecting means further including means for retaining said first and second jaws in the operating position.

16. A connector according to claim 14, wherein the means for retaining said jaws in the operating position comprises first and second magnetization means, positioned with respect to each other such that, at least at the said operating position, the second jaw is impelled to come into abutment with a rear surface of the chamber, the front of such chamber being defined as the portion thereof directly in communication with the opening.

17. A connector according to claim 1 or 15, wherein the said second jaw includes a coupling element being arranged to cooperate with the portable object in the operating position for stabilizing the object in the operating position.

18. A connector according to claim 10 or 11, wherein said retaining means comprises first and second magnetization means carried, respectively, by the second jaw and a first surface section of the chamber adjacent to said second jaw, and said first and second magnetization means exerting, one with respect to the other and at least in the said idle position of the second jaw, opposed magnetic forces for restraining the second jaw, in the operating position, said first and second magnetization means being adapted to exert, one with respect to the other, magnetic forces of attraction in at least the said idle position and means cooperating with said first and second jaws for retaining the first and second jaws in the operating position, said means for retaining said jaws in the operating position comprise said first and second magnetization means being positioned with respect to each other such that, at least at the said operating position, the second jaw is impelled to come into abutment with a rear surface of the chamber, the front of such chamber being defined as the portion thereof directly in communication with the opening.

19. A connector according to claim 18 wherein said entraining device comprises a stop integral with the second jaw and positioned to receive the said extreme section of the portable object.

20. A connector according to claim 18 wherein the said entraining device further includes a coupling element carried by at least one of the two jaws and being arranged to cooperate with the portable object between the operating position and, at most, the idle position.

* * * * *

UNITED STATES PATENT AND TRADEMARK OFFICE
CERTIFICATE OF CORRECTION

PATENT NO. : 4,443,049

DATED : April 17, 1984

INVENTOR(S) : Bertrand J.C.H. De Pommery and Jean-Paul C. Goupil

It is certified that error appears in the above-identified patent and that said Letters Patent are hereby corrected as shown below:

Column 21, line 8, delete [chamber] and substitute --close-- ; and

Column 22, line 22, change "comprises" to --comprise-- .

Signed and Sealed this

Thirtieth Day of October 1984

[SEAL]

Attest:

GERALD J. MOSSINGHOFF

Attesting Officer     Commissioner of Patents and Trademarks